United States Patent
Pursifull et al.

(10) Patent No.: US 10,024,251 B2
(45) Date of Patent: Jul. 17, 2018

(54) METHOD FOR CRANKCASE VENTILATION IN A BOOSTED ENGINE

(71) Applicant: Ford Global Technologies, LLC, Dearborn, MI (US)

(72) Inventors: Ross Dykstra Pursifull, Dearborn, MI (US); Nicholas Dashwood Crisp, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 14/743,280

(22) Filed: Jun. 18, 2015

(65) Prior Publication Data

US 2016/0369718 A1    Dec. 22, 2016

(51) Int. Cl.
| | |
|---|---|
| *F02D 41/00* | (2006.01) |
| *F02M 35/10* | (2006.01) |
| *F02M 25/06* | (2016.01) |
| *F01M 13/00* | (2006.01) |
| *B60T 13/46* | (2006.01) |
| *B60T 17/02* | (2006.01) |
| *F02B 37/12* | (2006.01) |

(52) U.S. Cl.
CPC .......... *F02D 41/0025* (2013.01); *B60T 13/46* (2013.01); *B60T 17/02* (2013.01); *F01M 13/00* (2013.01); *F01M 13/0011* (2013.01); *F02D 41/0007* (2013.01); *F02M 25/06* (2013.01); *F02M 35/10163* (2013.01); *F02M 35/10222* (2013.01); *F02M 35/10229* (2013.01); *F02B 37/127* (2013.01); *F02D 2250/08* (2013.01); *Y02T 10/144* (2013.01)

(58) Field of Classification Search
CPC .............. F01M 13/02; F01M 13/04; F01M 2013/0422; F01M 13/021; F01M 2013/026; F01M 13/028; F01M 2013/0022; F01M 2013/0044; F01M 2013/0083; F01M 2013/0077; F01M 13/022
USPC .... 123/572–574, 41.86, 516, 518, 520, 698, 123/DIG. 5; 73/114.39; 417/87; 188/356; 701/10, 70
See application file for complete search history.

(56) References Cited

U.S. PATENT DOCUMENTS

| | | |
|---|---|---|
| 4,530,210 A | 7/1985 | Yamazaki |
| 5,005,550 A | 4/1991 | Bugin, Jr. et al. |

(Continued)

FOREIGN PATENT DOCUMENTS

| | | |
|---|---|---|
| EP | 1959117 A1 | 8/2008 |
| EP | 2182185 A1 | 5/2010 |

OTHER PUBLICATIONS

Nasa Mass Flow Rate.pdf.*

(Continued)

*Primary Examiner* — David Hamaoui
*Assistant Examiner* — Carl Staulbach
(74) *Attorney, Agent, or Firm* — Julia Voutyras; McCoy Russell LLP (57) ABSTRACT

Methods and systems are provided for ventilating a crankcase in a boosted engine. An example method may include selectively enabling one of crankcase ventilation and aspirator motive flow via an electrically controlled valve, the aspirator motive flow being enabled in response to a demand for vacuum from a vacuum consumer. In this way, the crankcase of the boosted engine may be ventilated until the vacuum consumer demands vacuum.

5 Claims, 6 Drawing Sheets

(56) References Cited

U.S. PATENT DOCUMENTS

| | | | |
|---|---|---|---|
| 5,349,935 A | 9/1994 | Mezger et al. | |
| 5,408,866 A | 4/1995 | Kawamura et al. | |
| 5,592,923 A | 1/1997 | Machida | |
| 5,629,477 A | 5/1997 | Ito | |
| 5,970,957 A | 10/1999 | Fried et al. | |
| 6,017,100 A * | 1/2000 | Mizuno | B60T 13/46 123/295 |
| 6,047,670 A | 4/2000 | Stella et al. | |
| 6,138,644 A | 10/2000 | Saruwatari et al. | |
| 6,446,618 B1 | 9/2002 | Hill | |
| 6,637,416 B2 | 10/2003 | Wakahara | |
| 6,688,104 B2 | 2/2004 | Baeuerle et al. | |
| 6,779,388 B2 | 8/2004 | Baeuerle et al. | |
| 6,968,732 B2 | 11/2005 | Nakoji | |
| 7,007,682 B2 | 3/2006 | Takahashi et al. | |
| 7,011,690 B2 | 3/2006 | Altvater et al. | |
| 7,275,527 B2 | 10/2007 | Bruchner et al. | |
| 7,316,223 B2 | 1/2008 | Wakahara | |
| 7,523,748 B2 | 4/2009 | Hirano et al. | |
| 7,743,752 B2 | 6/2010 | Kerns et al. | |
| 7,886,727 B2 * | 2/2011 | Ulrey | F02D 9/12 123/516 |
| 8,109,259 B2 | 2/2012 | Ulrey et al. | |
| 8,925,520 B2 | 1/2015 | Pursifull et al. | |
| 9,027,536 B2 | 5/2015 | Pursifull et al. | |
| 9,435,300 B2 * | 9/2016 | Pursifull | F02M 35/10229 |
| 9,759,168 B2 * | 9/2017 | Pursifull | F02M 25/089 |
| 2004/0244368 A1 | 12/2004 | Yang et al. | |
| 2007/0227515 A1 | 10/2007 | Uchida | |
| 2008/0103667 A1 * | 5/2008 | Suzuki | B60T 17/02 701/70 |
| 2008/0173284 A1 | 7/2008 | Kavanagh et al. | |
| 2009/0090337 A1 | 4/2009 | Asanuma et al. | |
| 2009/0308364 A1 | 12/2009 | Konohara | |
| 2009/0320809 A1 | 12/2009 | Ruppel et al. | |
| 2010/0147270 A1 | 6/2010 | Pursifull et al. | |
| 2010/0300413 A1 * | 12/2010 | Ulrey | F02D 9/12 123/518 |
| 2011/0270500 A1 * | 11/2011 | Ummer | B60T 8/4045 701/70 |
| 2011/0270501 A1 * | 11/2011 | Ito | F02N 11/0833 701/70 |
| 2013/0340732 A1 | 12/2013 | Pursifull et al. | |
| 2014/0014080 A1 * | 1/2014 | Beshay | F01M 13/022 123/574 |
| 2014/0137544 A1 | 5/2014 | Pursifull et al. | |
| 2014/0318514 A1 | 10/2014 | Pursifull | |
| 2015/0158477 A1 * | 6/2015 | Luehrsen | B60T 13/72 701/22 |
| 2016/0115913 A1 * | 4/2016 | Doke | B60T 13/52 123/520 |
| 2016/0326990 A1 * | 11/2016 | Pursifull | F02M 25/089 |

OTHER PUBLICATIONS

Pursifull R. et al., "Method for Reducing Air Flow in an Engine at Idle," U.S. Appl. No. 14/628,029, filed Feb. 20, 2015, 59 pages.

Pursifull R., "Increasing Crankcase Ventilation Flow Rate Via Active Flow Control," U.S. Appl. No. 14/706,689, filed May 7, 2015, 58 pages.

* cited by examiner

METHOD FOR CRANKCASE VENTILATION IN A BOOSTED ENGINE

FIELD

The present description relates generally to methods and systems for ventilating a crankcase of a boosted engine while enabling vacuum generation.

BACKGROUND/SUMMARY

Unburned fuel and other combustion products may escape past the piston and valve guides of an internal combustion engine (e.g., an internal combustion engine of a vehicle) into the crankcase. The resulting gases in the crankcase, often referred to as "blow-by" gases, may contribute to the formation of sludge in the engine oil supply. Further, blow-by gases may excessively pressurize the crankcase, resulting in undesirable leakage of oil pan gasket and crankcase seals. To avoid these issues, an engine may include a crankcase ventilation (CV) system coupled to the intake, which serves to vent blow-by gases from the crankcase to the intake. The CV system may include a passive crankcase ventilation (CV) valve intermediate the crankcase and the engine intake passage, to regulate the flow of blow-by gases from the crankcase to the intake manifold.

An example crankcase ventilation system is shown by Pursifull et al. in U.S. Pat. No. 8,925,520. Herein, crankcase gases are directed through an aspirator to generate vacuum that is supplied to a vacuum consumer. The example system in U.S. Pat. No. 8,925,520 includes a passive control valve for regulating crankcase ventilation into the aspirator and into an intake manifold. The passive control valve is arranged intermediate a crankcase and the intake manifold.

Various types of CV valves may be used in CV systems to regulate crankcase ventilation flow. In one example, the CV valve may enable a higher flow rate of crankcase gases into the intake manifold in the case of low (or shallow) intake manifold vacuum. During conditions when the intake manifold has a lower vacuum (e.g., shallow vacuum such as 0-15 kPa), the engine has a larger air flow rate and can accept a larger crankcase ventilation flow rate. In the case of higher levels of intake manifold vacuum (e.g. deeper such as vacuum deeper than 80 kPa), such as during engine idle conditions, the CV valve may be substantially closed, and a smaller ventilation flow rate of crankcase gases may be allowed therethrough. Thus, the CV valve controls (e.g., limits) the flow of crankcase vapors into the intake manifold during idle conditions in order to reduce the idle air flow rate and thereby, limit engine air consumption at idle.

The inventors herein have recognized potential issues with the example system of U.S. Pat. No. 8,925,520. As an example, vacuum generation by the aspirator using crankcase ventilation flow may be insufficient during certain engine conditions. For example, when intake manifold vacuum is in the range of 20-80 kPa, the flow rate of crankcase vapors allowed into the intake manifold via the CV valve may be lower. This lower flow rate of crankcase vapors may not generate sufficient vacuum for the vacuum consumer. Further still, even though the vacuum consumer may be fluidically coupled to the intake manifold, vacuum levels in the intake manifold may be inadequate for direct replenishment of the vacuum consumer.

The inventors herein have identified an approach to at least partly address the above issue. In one example approach, a method for an engine comprises selectively enabling one of crankcase ventilation flow and aspirator motive flow via an electrically controlled valve responsive to a desired engine air flow and a demand for vacuum from a vacuum consumer. In this way, demand for vacuum by the vacuum consumer may be met during various engine conditions.

As one example, an engine may include an electrically controlled valve that may fluidically couple each of a crankcase and an aspirator to an intake manifold of the engine. The aspirator may, in turn, be coupled to a vacuum consumer. The electrically controlled valve may be configured to allow crankcase ventilation flow into the intake manifold for a larger duration of engine operation. However, when the vacuum consumer demands vacuum, the electrically controlled valve may be adjusted to enable motive flow through the aspirator while obstructing crankcase ventilation. Motive flow through the aspirator may generate vacuum that can be provided to the vacuum consumer.

In this way, each of crankcase ventilation and vacuum generation via an aspirator may be actively controlled. Vacuum may be generated for a vacuum consumer even when there is insufficient crankcase ventilation flow. Further, the crankcase may be purged of vapors when vacuum generation is not desired. Thus, crankcase ventilation may be increased while providing vacuum generation when desired. By using a single valve to control each of crankcase ventilation and vacuum generation at the aspirator, component expenses may be reduced. Further still, additional control valves, such as an aspirator shut-off valve that controls motive flow through the aspirator, may not be needed. Accordingly, costs may be reduced while also reducing packaging issues. As such, since brake vacuum replenishment may be desired occasionally and crankcase ventilation may not need to occur continuously, crankcase ventilation may be interrupted temporarily for enabling recovery of brake vacuum when desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
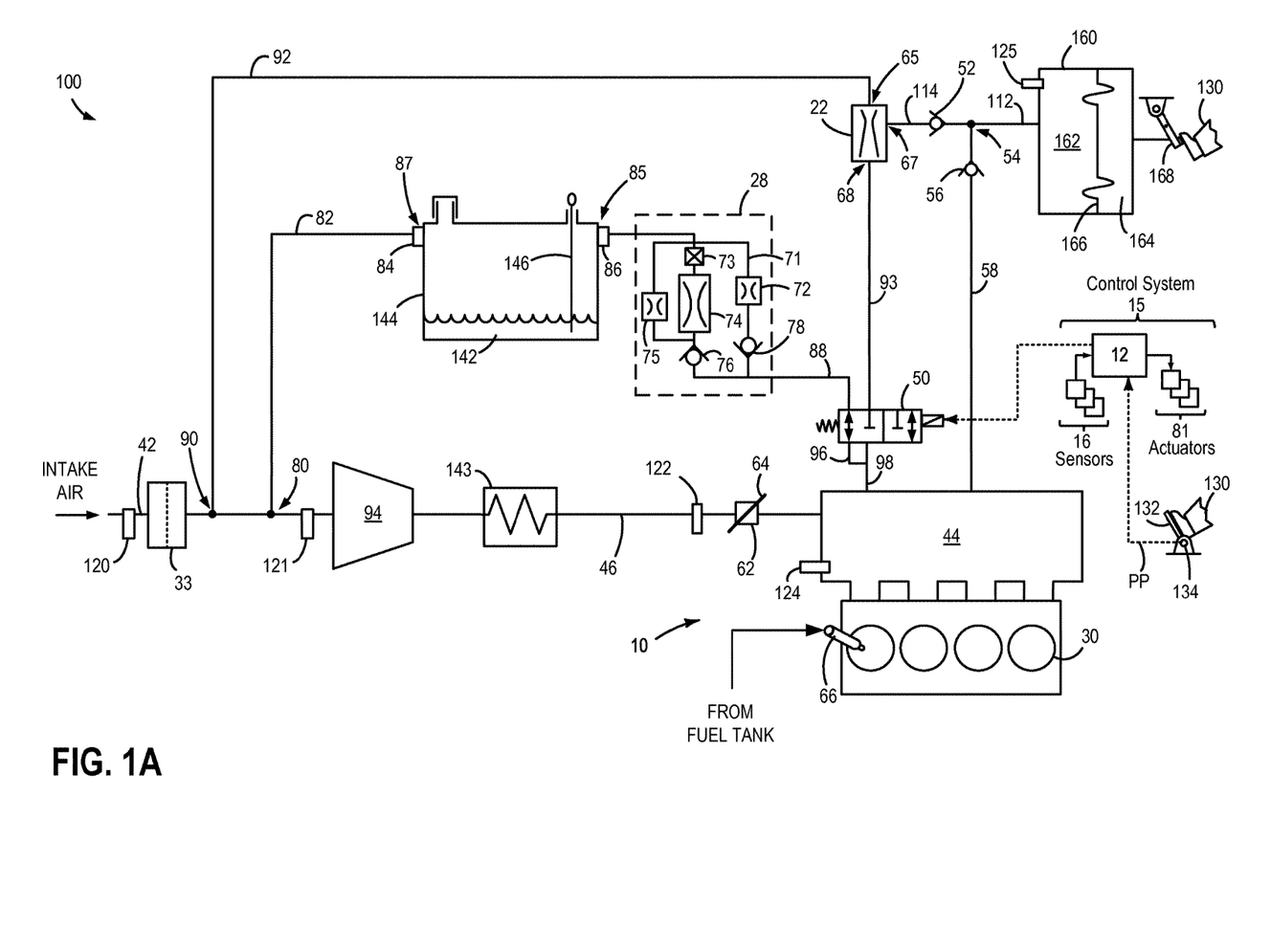
FIGS. 1A, 1B, and 1C depict a schematic engine system in accordance with the present disclosure.
Figure 1B:
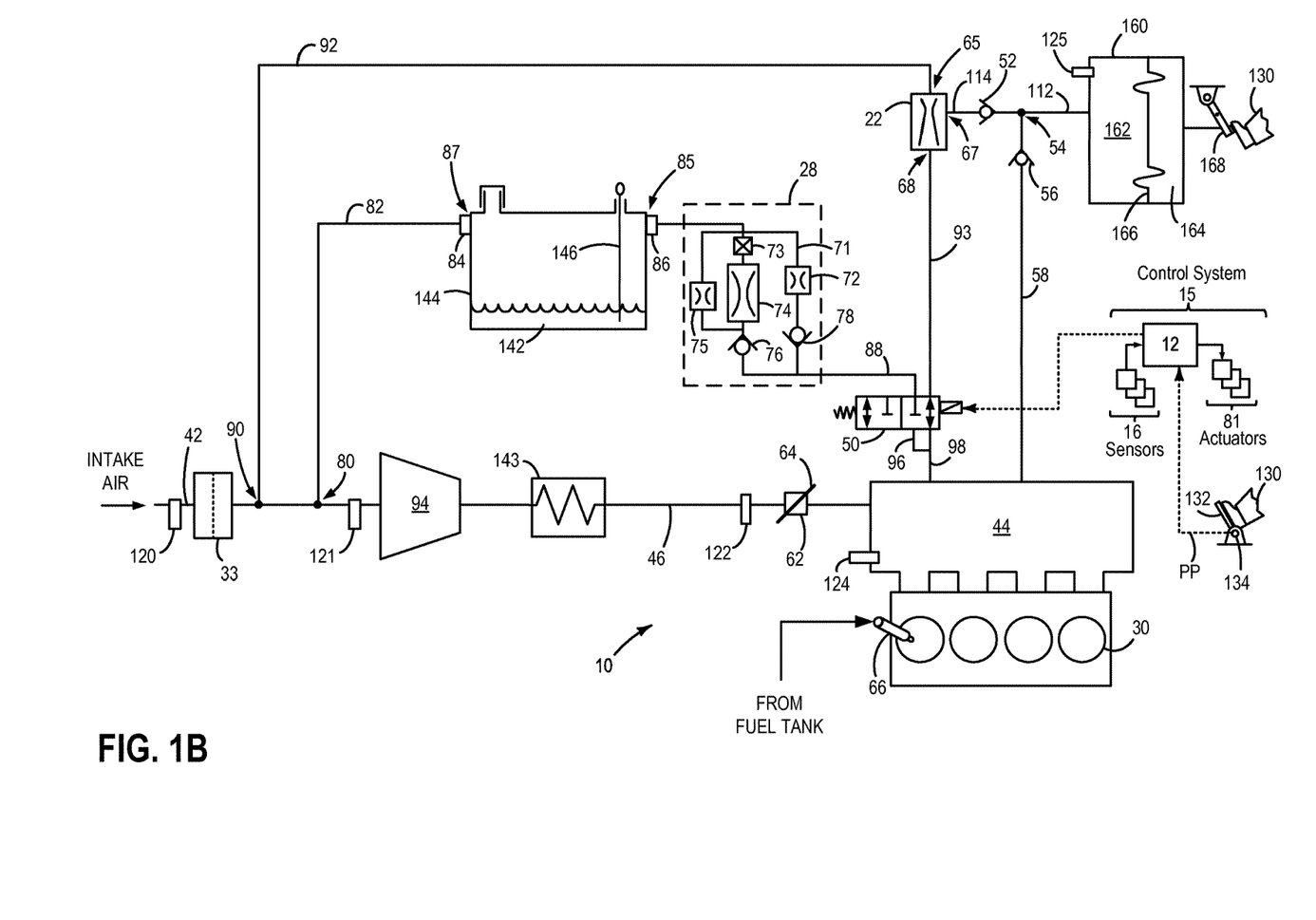
Figure 1C:
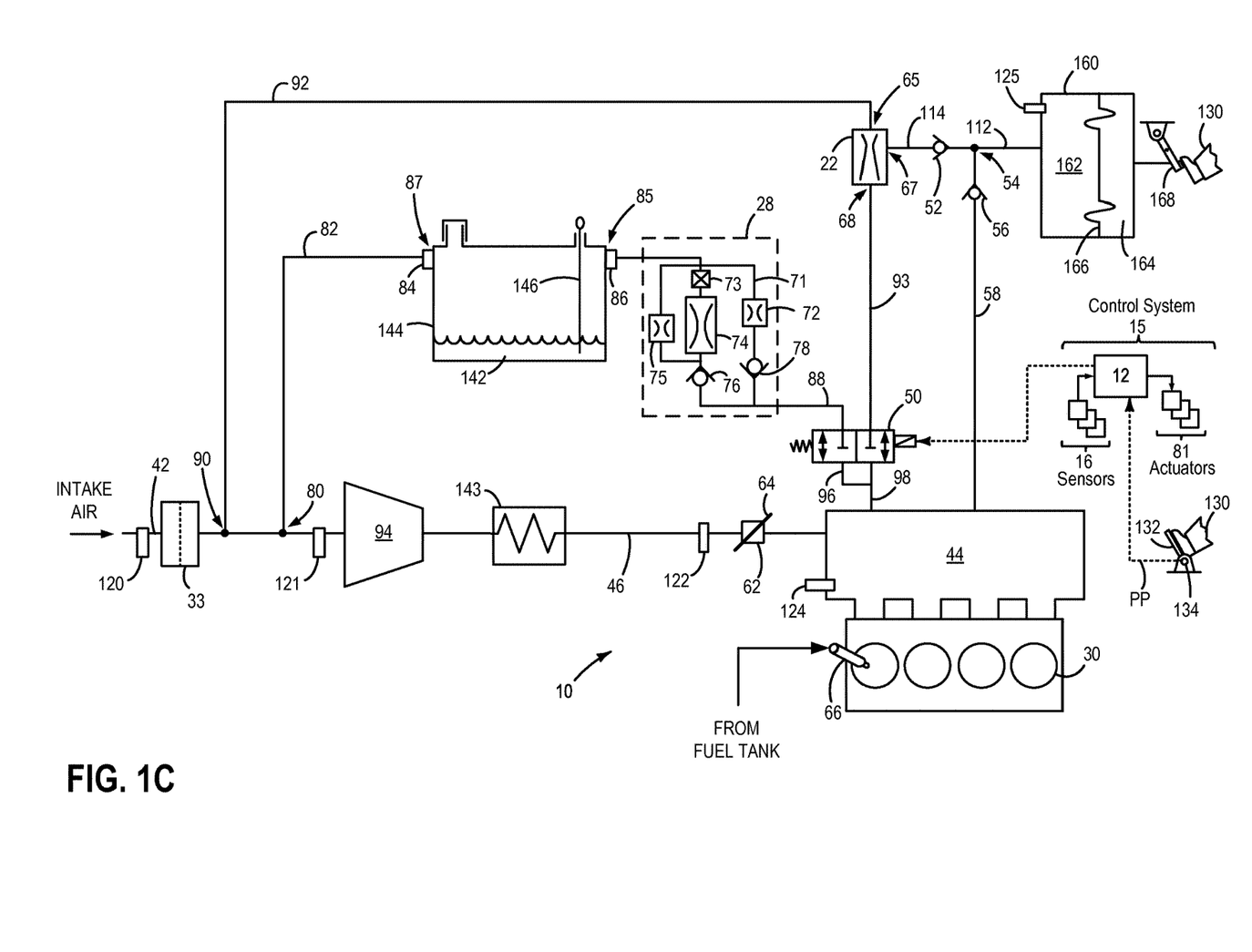
Figure 2:
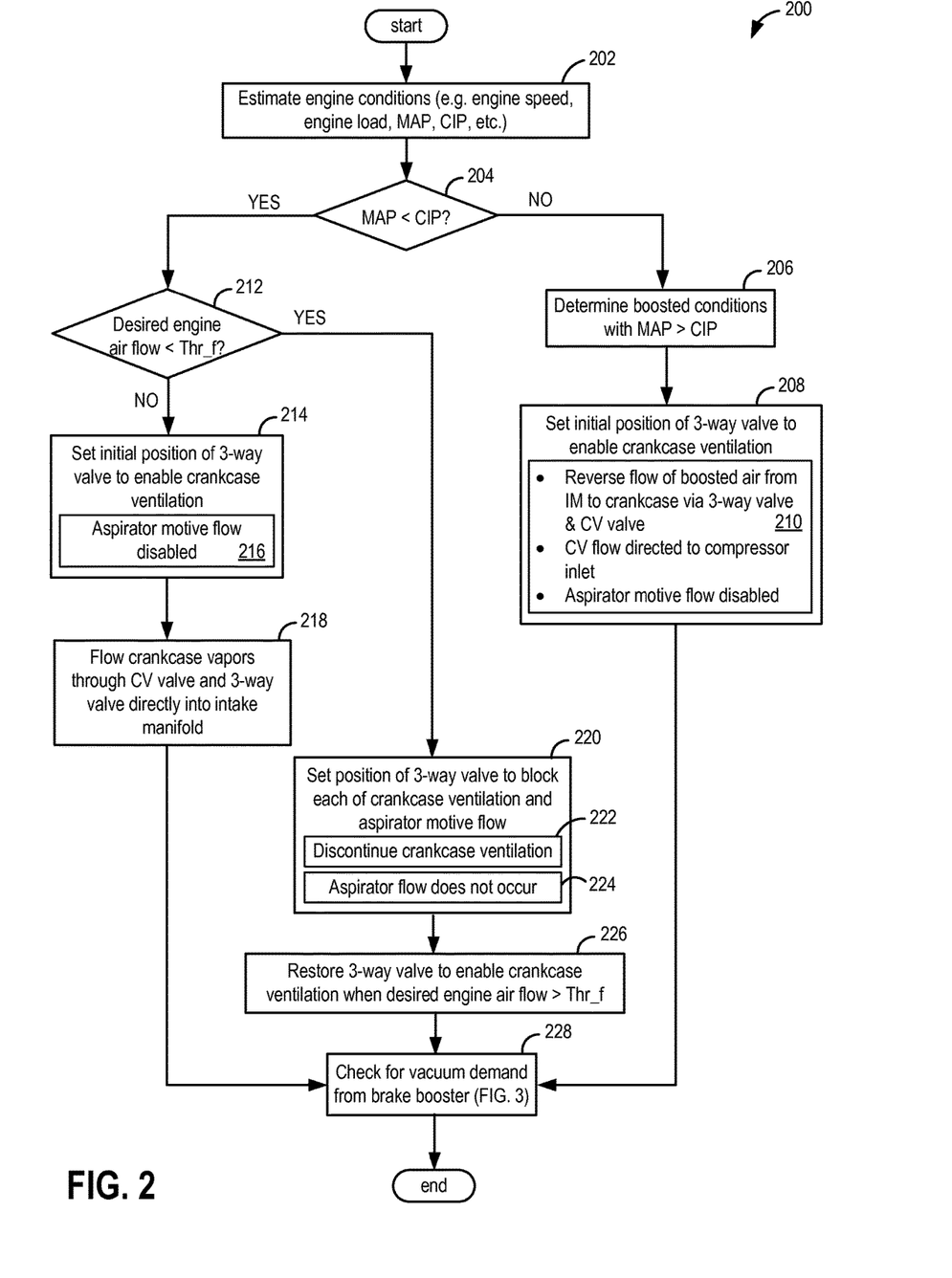
FIG. 2 presents a high level flow chart illustrating setting a position of a valve to enable crankcase ventilation flow during various engine conditions.
Figure 3:
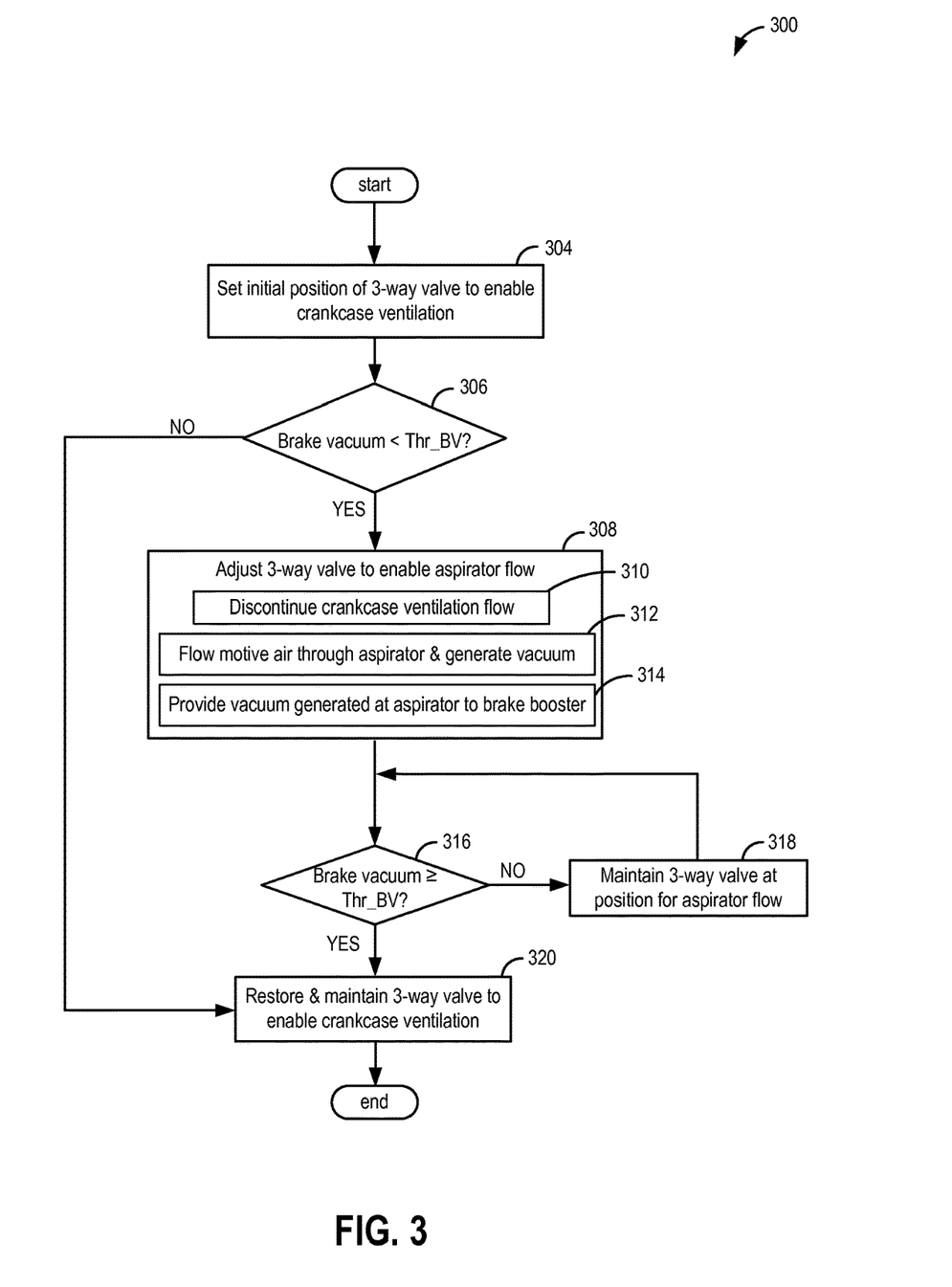
FIG. 3 portrays an example flow chart for modifying the position of the valve based on demand for vacuum from a vacuum consumer.
Figure 4:
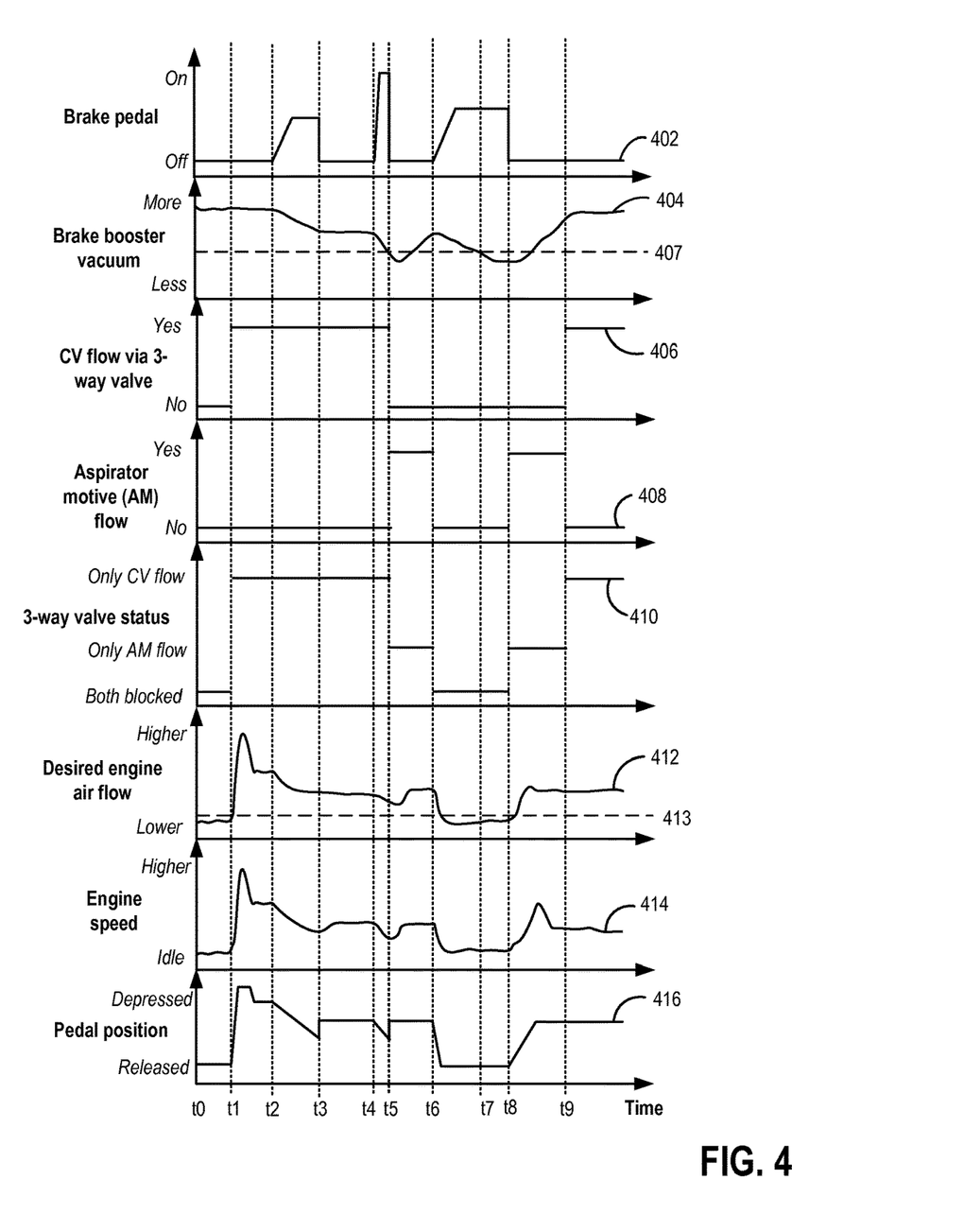
FIG. 4 is an example operation of the engine system of FIGS. 1A, 1B, and 1C.

The following description relates to systems and methods for providing ventilation of a crankcase of an engine, such as the example engine systems depicted in FIGS. 1A, 1B, and 1C. The engine system may include an electrically controlled valve that allows flow of either crankcase vapors or motive flow through an aspirator. Crankcase ventilation may be enabled during engine operation based on a desired engine air flow rate (FIG. 2). When a demand for vacuum is received from a vacuum consumer, crankcase ventilation may be suspended by modifying a position of the electrically controlled valve to enable motive flow through the aspirator (FIG. 3). Vacuum generated at the aspirator may be supplied to the vacuum consumer. Example adjustments of the electrically controlled valve are depicted in FIG. 4. In this way, the crankcase may be purged of vapors in a continuous manner while allowing vacuum generation at the aspirator only when desired.

Referring now to FIG. 1A, it shows aspects of an example engine system 100 which may be included in an automotive vehicle. It will be appreciated that FIGS. 1B and 1C include the same engine system as in FIG. 1A. The engine system is configured for combusting fuel vapor accumulated in at least one component thereof. Engine system 100 includes a multi-cylinder internal combustion engine 10 which may propel the automotive vehicle. Engine 10 may be controlled at least partially by a control system 15 including a controller 12 and by input from a vehicle operator 130 via an input device 132. In this example, input device 132 includes an accelerator pedal and a pedal position sensor 134 for generating a proportional pedal position signal PP.

Engine system 100 may receive intake air via intake passage 42. As shown at FIG. 1A, intake passage 42 may include an air filter 33 (also termed air cleaner 33) positioned upstream of compressor 94. Engine 10 also includes an intake throttle 62 arranged downstream of compressor 94 fluidically coupled to the intake manifold 44. Intake throttle 62 may include a throttle plate 64, and in the depicted example a position of the throttle plate 64 may be varied by controller 12 via a signal provided to an electric motor or actuator included with intake throttle 62, a configuration that is commonly referred to as electronic throttle control (ETC). In this manner, intake throttle 62 may be operated to vary an amount of intake air provided to intake manifold 44 and the plurality of cylinders therein.

A mass air flow sensor 120 may be coupled at an inlet of intake passage 42 for providing a signal MAF regarding engine air flow into the intake. A compressor inlet pressure (CIP) sensor 121 may be coupled downstream of air cleaner 33 and upstream of compressor 94 to provide a signal regarding pressure of air entering compressor 94. As such, CIP sensor 121 may also provide an indication of atmospheric or barometric pressure (BP). Further, a throttle inlet pressure sensor 122 (also termed TIP sensor 122) may be coupled immediately upstream of intake throttle 62 for providing a signal regarding throttle inlet pressure (TIP) or boost pressure to controller 12. Further still, a manifold air pressure sensor 124 may be coupled to intake manifold 44 for providing a signal regarding manifold air pressure (MAP) to controller 12.

Intake manifold 44 is configured to supply intake air or an air-fuel mixture to a plurality of combustion chambers 30 (also termed, cylinders 30) of engine 10. Each of the plurality of cylinders 30 may include a corresponding piston reciprocating within (not shown). The combustion chambers 30 may be arranged above a lubricant-filled crankcase 144 such that reciprocating pistons of the combustion chambers rotate a crankshaft (not shown) located in the crankcase 144. Crankcase 144 in FIG. 1A is depicted away from cylinders 30 for simplifying the description of the embodiment.

Combustion chambers 30 may be supplied one or more fuels via fuel injectors 66. Fuels may include gasoline, alcohol fuel blends, diesel, biodiesel, compressed natural gas, etc. Fuel may be supplied to the combustion chambers via direct injection (as shown in FIG. 1A), port injection, throttle valve-body injection, or any combination thereof. It will be noted that a single fuel injector 66 is depicted in FIG. 1A and though not shown, each combustion chamber 30 may be coupled with a respective fuel injector 66. In the combustion chambers, combustion may be initiated via spark ignition and/or compression ignition.

Unburned fuel and other combustion products may escape past each piston and/or valve guides from cylinders 30 into crankcase 144. The resulting gases in the crankcase, often referred to as "blow-by" gases, may contribute to the formation of sludge in the engine oil supply. Further, blow-by gases may excessively pressurize the crankcase 144, resulting in undesirable leakage of an oil pan gasket and crankcase seals. To reduce these issues, engine 10 may include a crankcase ventilation (CV) system, which serves to vent blow-by gases from the crankcase 144 to intake manifold 44. Further details of the CV system will be provided below.

Exhaust gases from combustion chambers 30 may exit engine 10 via an exhaust manifold (not shown) into an emission control device (not shown) coupled to an exhaust passage (not shown).

Compressor 94 of engine system 100 provides a boosted intake air charge to intake manifold 44. In the example of a turbocharger compressor, compressor 94 may be mechanically coupled to and driven by an exhaust turbine (not shown) powered by exhaust gases flowing from the engine. The exhaust turbine may be positioned in the exhaust passage and may be driven by exhaust gases. A wastegate (not shown) may be coupled across the exhaust turbine of the turbocharger. Specifically, the wastegate may be included in a bypass passage coupled between an inlet and outlet of the exhaust turbine. By adjusting a position of the wastegate, an amount of boost provided by the exhaust turbine may be controlled. Alternatively, compressor 94 may be any suitable intake-air compressor, such as a motor-driven supercharger compressor.

In the configuration illustrated in FIG. 1A, compressor 94 draws fresh air from air cleaner 33, compresses air, and flows compressed air through intercooler 143. The intercooler may also be termed a charge air cooler. As such, each of compressor 94 and intercooler 143 are positioned upstream of intake throttle 62. In alternative embodiments, the intercooler 143 may be positioned downstream of the intake throttle, and as such, may be housed in the intake manifold. Compressor 94 draws air from intake passage 42 to supply pressurized air to boost chamber 46. Boost chamber 46 is arranged between compressor 94 and intake throttle 62. The intercooler 143 cools the compressed air, which then flows via intake throttle 62 to intake manifold 44, depending on the position of throttle plate 64 of intake throttle 62.

Crankcase 144 includes lubricating oil 142 and a dipstick 146 for measuring a level of oil 142 within crankcase 144. Oil separator 86 is coupled to a first port 85 of crankcase 144 while oil separator 84 is coupled to a second port 87 of crankcase 144. Oil particles present in blow-by gases (also termed, crankcase vapors) may be selectively filtered via each of oil separator 84 and oil separator 86 before these crankcase vapors are delivered to intake passage 42 or intake manifold 44.

The CV system may include a CV valve 28 intermediate the crankcase 144 and the intake manifold 44, to regulate the flow of blow-by gases from the crankcase to the intake manifold. As shown, CV valve 28 is fluidically coupled to conduit 88 (also termed crankcase ventilation tube 88), and conduit 88, in turn, is fluidically coupled to crankcase 144 via oil separator 86. Conduit 88 may be fluidically coupled to intake manifold 44 via each of channel 96 and conduit 98 based on a position of common valve 50. Crankcase 144 therefore can fluidically communicate with intake manifold 44 via crankcase ventilation tube 88 which includes crankcase ventilation (CV) valve 28 coupled therein. As such, crankcase ventilation may occur along crankcase ventilation tube 88 (also termed crankcase ventilation path 88) and CV valve 28 during engine conditions when pressure in intake manifold 44 is lower than barometric pressure (or MAP is lower than CIP). Specifically, vapors from crankcase 144 may exit crankcase 144 via oil separator 86 at the first port of crankcase into crankcase ventilation tube 88, and thereon flow through each of CV valve 28 and common valve 50, into channel 96 and via conduit 98 streaming directly into intake manifold 44.

Crankcase 144 is also fluidically coupled to intake passage 42 via conduit 82. Specifically, conduit 82 fluidically couples oil separator 84 at the second port 87 of crankcase 144 to intake passage 42 at location 80 which is upstream of compressor 94 and downstream of air cleaner 33. During conditions when pressure in the intake manifold 44 is higher than CIP, crankcase vapors may exit crankcase 144 via oil separator 84 at second port 87 of crankcase 144 into conduit 82, and flow through conduit 82 to location 80 at an inlet of compressor 94. Further, these crankcase vapors arriving at the intake passage 42 at location 80 may merge with fresh intake air being drawn into compressor 94, and flow through compressor 94, past intercooler 143, across intake throttle 62, and into intake manifold 44 for combustion within cylinders 30.

In one non-limiting example, crankcase ventilation (CV) valve 28 may include a first orifice 74, a second orifice 75, and a third orifice 72 (also termed, reverse flow orifice 72). As shown, the first orifice 74 is positioned in a parallel manner to second orifice 75. Similarly, first orifice 74 is also arranged parallel to third orifice 72. Each orifice serves to regulate a flow rate of gases passing therethrough, to an extent that is proportional to a size of the orifice. In the depicted example, first orifice 74 may be larger than each of second orifice 75 and third orifice 72. Accordingly, first orifice 74 may allow a larger amount of flow and/or a higher flow rate of crankcase gasses as compared to the flow rate allowed through either second orifice 75 or the third orifice 72. Each of second orifice 75 and third orifice 72 may be similar in size. In other words, flow rate of fluids through the second orifice 75 may be the same as the flow rate through third orifice 72. Alternatively, the second orifice 75 may have a slightly larger size than the third orifice 72. Herein, the second orifice 75 may provide a slightly higher fluid flow rate than that provided by third orifice 72. In yet another example, third orifice 72 may have a slightly larger size than the second orifice 75.

CV valve 28 may additionally include check valve 76 positioned in series with first orifice 74. Check valve 76 is positioned downstream of first orifice 74. Alternately, check valve 76 may be positioned upstream of first orifice 74. As such, check valve 76 may allow flow from the crankcase 144 towards the intake manifold 44 while impeding fluid flow from the intake manifold 44 towards the crankcase 144. Fluid flow (e.g., crankcase vapor flow) from crankcase 144 towards intake manifold 44 may be termed forward flow whereas fluid flow (e.g., boosted air and fuel vapors) from the intake manifold 44 to the crankcase 144 may be termed reverse flow. Forward flow of crankcase gases may largely occur during conditions when pressure in intake manifold 44 is lower than CIP. Reverse flow may occur during conditions when the intake manifold 44 has a higher pressure than the crankcase 144. As another example, reverse flow may occur during conditions when the engine is boosted and intake manifold pressure is higher than CIP (and/or BP).

Further still, as depicted in the schematic portrayal of CV valve 28, reverse flow (e.g., fluid flow from intake manifold 44 to crankcase 144) may be forced through third orifice 72 along reverse flow passage 71. As such, check valve 76 may block reverse flow. Check valve 78 is arranged in series with reverse flow orifice 72 such that it impedes fluid flow from crankcase 144 through reverse flow orifice 72 towards intake manifold 44. However, check valve 78 allows fluid flow from intake manifold 44, through reverse flow orifice 72, and thereon into crankcase 144.

CV valve 28 may be a passive control valve schematically illustrated as a passive valve switching between first orifice 74, second orifice 75, and third orifice 72. In the embodiment shown in FIG. 1A, CV valve 28 additionally includes a pneumatically-controlled valve 73 arranged in series with first orifice 74. The series arrangement of valve 73 and first orifice 74 (and check valve 76) is arranged in parallel with the series arrangement of third orifice 72 and check valve 78. Likewise, the series arrangement of valve 73 and first orifice 74 is arranged in parallel with second orifice 75. As such, valve 73 essentially selects between a large orifice (first orifice 74) and a smaller orifice (second orifice 75 which may be located within valve 73) for forward flow of crankcase gases.

In one example, a crankcase ventilation valve may be designed such that it has a larger opening (e.g., first orifice 74) during shallow intake manifold vacuum conditions and a smaller opening (e.g., second orifice 75) during deep vacuum levels in the intake manifold. Herein, air flow rate from the crankcase ventilation valve into the intake manifold may be reduced (e.g., restricted to a minimum) when the desired engine air flow rate demand is significantly low. At the same time, the crankcase ventilation valve allows increased crankcase ventilation rates when the engine demands a higher engine air flow rate.

It will be noted that CV valve 28 (and valve 73) is not controlled by controller 12. Instead, CV valve 28 (and valve 73) may be controlled by vacuum level and/or pressure in the intake manifold 44.

CV valve 28 of FIG. 1A is depicted schematically to illustrate the functioning of a crankcase ventilation valve. However, the implementation of the CV valve may vary across different embodiments. In one example implementation, CV valve 28 may include an internal restrictor (e.g., a cone or ball), and/or may be a spring-actuated valve. The position of the internal restrictor and thus the flow through the valve may be regulated by the pressure differential between the intake manifold and the crankcase. For example, when there is no vacuum in the intake manifold, such as during engine off conditions, a spring may keep a base of the internal restrictor seated against an end of a housing of the valve which communicates with the crankcase, such that the valve is in a fully closed position. In contrast, when there is a higher level of vacuum (e.g., deeper vacuum) in the intake manifold, such as under engine idle or deceleration conditions, the internal restrictor moves upward within the valve housing towards the intake manifold end of the valve housing due to the increase in intake manifold vacuum. At this time, CV valve 28 is substantially closed, and crankcase vapors move through a small annular opening between the internal restrictor and the valve housing. This may be schematically represented as second orifice 75.

When intake manifold vacuum is at a lower level (e.g., vacuum such as 20-50 kPa), for example during part-throttle operation, the internal restrictor moves closer to the crankcase end of the valve housing, and CV flow moves through a larger annular opening (relative to the annular opening at deeper vacuum levels) between the internal restrictor and the valve housing. At this time, CV valve 28 is partially open. Schematically, this may be represented by a progressive opening of valve 73 and an increase in CV flow.

Finally, a further decrease in intake manifold vacuum (e.g., 0-15 kPa), for example during higher load conditions, moves the internal restrictor even closer to the crankcase end of the valve housing, such that CV flow moves through an even larger annular opening between the internal restrictor and the valve housing. At this time, valve 73 (and CV valve 28) is considered to be fully open, such that CV flow through the valve is maximized. In this way, the opening state of valve 73 (and CV valve 28) is influenced by manifold vacuum, and the flow rate through CV valve 28 (and valve 73) increases as pressure drop across the valve 73 decreases.

Reverse flow orifice 72 may, in one example, be formed as a lengthwise orifice through the length of the internal restrictor allowing a fixed amount of fluid flow to be metered through the CV valve 28 even when the CV valve is fully closed. The reverse flow orifice may be enabled as a purposeful or deliberate leak in CV valve 28 such that during boosted engine conditions when the pressure in the intake manifold is higher than barometric pressure (and/or CIP), the reverse flow orifice extending through the length of the cone may meter a smaller quantity of fresh boosted air from the intake manifold towards the crankcase enabling conduit 82 to function as a fresh air path. To elaborate, when common valve 50 enables fluidic communication between CV valve 28 and intake manifold 44 during boosted engine conditions, a nominal quantity of boosted air from the intake manifold may flow through common valve 50 and third orifice 72 in CV valve 28 into crankcase case 144. Further, blow-by gases may exit crankcase 144 towards intake passage 42 via conduit 82 during boosted conditions. These blow-by gases may now be combined with the nominal quantity of fresh boosted air received from intake manifold 44 via the reverse flow orifice 72 of the CV valve 28.

Engine system 100 may additionally include a brake booster 160 coupled to vehicle wheel brakes (not shown). A vacuum reservoir 162 of brake booster 160 may be coupled to the intake manifold via each of conduit 112 and brake booster vacuum line 58. A check valve 56 coupled within brake booster vacuum line 58 may allow air to flow from brake booster 160 (specifically, from vacuum reservoir 162) to the intake manifold 44 while obstructing air flow to brake booster 160 from the intake manifold 44. In other words, vacuum reservoir 162 may receive vacuum from the intake manifold 44 via brake booster vacuum line 58 and conduit 112. As such, vacuum may be transferred along brake booster vacuum line 58 and conduit 112 towards vacuum reservoir 162 of brake booster 160 when deeper levels of vacuum are present in the intake manifold 44.

The vacuum reservoir 162 may also receive vacuum from an aspirator 22. Herein, vacuum reservoir 162 may receive vacuum from a suction port 67 of aspirator 22 along conduit 112 and suction line 114. As shown, conduit 112 splits into brake booster vacuum line 58 and suction line 114 at node 54. In other words, suction line 114 and brake booster vacuum line 58 merge at node 54 to form conduit 112. Suction line 114 also includes check valve 52 to allow fluid flow from brake booster 160 (specifically, from vacuum reservoir 162 of brake booster 160) towards suction port 67 of aspirator 22. Check valve 52, however, blocks the flow of fluids, e.g. air, from aspirator 22 towards brake booster 160.

Vacuum reservoir 162 may be arranged behind a diaphragm 166 of the brake booster for amplifying a force provided by vehicle operator 130 via input device 168 for applying vehicle wheel brakes (not shown). In one embodiment, the brake pedal 168 may be mechanically coupled to the brake booster 160. Depression of the brake pedal 168 may open a valve in the brake booster 160 (not shown) allowing outside air to flow into working chamber 164 of the brake booster 160. As such, the force applied to the brake pedal 168 may be amplified by the brake booster 160, reducing the amount of force required by the vehicle operator 130 to depress the brake pedal 168. A vacuum level at brake booster 160 (or a pressure in the brake booster) may be estimated by pressure sensor 125. Brake booster 160 works by using a pressure difference across the diaphragm 166. By allowing atmospheric air to enter the working chamber 164, a differential pressure may be formed across diaphragm 166, and a force may be created to assist the force applied to brake pedal 168.

It will be appreciated that engine system 100 may include additional vacuum consumption devices such as a fuel vapor canister, vacuum actuated valves, etc., which may receive vacuum from either intake manifold or from the suction port of aspirator 22.

Aspirator 22 is included in engine system 100 fluidically coupling conduit 92 and conduit 93. As shown in FIG. 1A, a converging portion of aspirator 22 is proximal to the conduit 92, whereas a diverging portion of aspirator 22 is proximal to conduit 93. Conduits 92 and 93 may be part of a compressor bypass passage. Further still, conduits 92, aspirator 22, and conduit 93 may also bypass intake throttle 62. Conduit 92 enables fluidic communication between motive inlet 65 of aspirator 22 and intake passage 42. Meanwhile, conduit 93 enables fluidic communication between motive outlet 68 of aspirator 22 and common valve 50, and at a specific position of common valve 50, motive outlet 68 may be further fluidically coupled to intake manifold 44. Thus, in one example, aspirator 22 may receive intake air from intake passage 42 as motive flow and may discharge this intake air to intake manifold 44 when common valve 50 enables fluidic communication between aspirator 22 and intake manifold 44. Motive air flow through aspirator 22 may enable vacuum to be generated at aspirator 22. Air flow through aspirator 22 creates a low pressure region within the aspirator 22, thereby providing a vacuum source for vacuum reservoirs and vacuum consumption devices such as brake booster 160, fuel vapor canister, vacuum actuated valves (not shown), etc. Aspirators (which may alternatively be referred to as ejectors, venturis, jet pumps, and eductors) are, therefore, passive vacuum generating devices which can provide low-cost vacuum generation when utilized in engine systems. The amount of vacuum generated by aspirator 22 may be dependent on a motive air flow rate through aspirator 22.

Engine system 100 also includes common valve 50 positioned intermediate the intake manifold and each of CV valve 28 and aspirator 22. Specifically, common valve 50 is intermediate the CV valve 28 and intake manifold 44. Further, common valve 50 is also positioned intermediate motive outlet 68 of aspirator 22 and intake manifold 44. Common valve 50 may be an electrically controlled valve that may be actuated via commands from controller 12. In the depicted example, common valve 50 is a three-way valve. As such, common valve 50 may be a three-port valve. Herein, common valve 50 may also be termed three-way valve 50. In other words, common valve 50 is a multi-position valve, movable between a first, a second, and a third position, allowing for the selection of different pathways. As such, common valve 50 may determine if crankcase ventilation is enabled or if motive air flow through the aspirator 22 is activated. Further, common valve 50 may also terminate each of crankcase ventilation and aspirator motive flow at the same time. It will be noted, though, that common valve 50 may not allow simultaneous flows from the crankcase (e.g., crankcase ventilation) and the aspirator 22 (e.g., aspirator motive flow). In other words, common valve 50 may allow crankcase ventilation alone or enable only aspirator motive flow. To elaborate, ventilation of the crankcase 144 may be enabled independent of (and mutually exclusively from) aspirator motive flow. Further, the common valve 50 may also assume a position wherein neither crankcase ventilation nor aspirator motive flow are permitted therethrough (such as that shown in FIG. 1C).

In the example of FIG. 1A, common valve 50 is commanded to a position enabling fluidic communication between crankcase 144 and intake manifold 44. Specifically, the first port 85 (with oil separator 86) of crankcase 144 is fluidically coupled to intake manifold 44 via the common valve 50 in FIG. 1A. Fluid flow may occur through common valve 50 in either the forward flow direction (e.g., from crankcase 144 to intake manifold 44) or in the reverse flow direction (e.g. from intake manifold 44 towards crankcase 144).

It will also be noted that when common valve 50 is in the position enabling fluidic communication between crankcase 144 and intake manifold 44, conduit 93 from motive outlet 68 of aspirator 22 is not fluidically coupled to conduit 98 (and therefore, intake manifold 44). As such, when the crankcase (e.g., first port 85 of crankcase) is in fluidic communication with the intake manifold, the aspirator is not in fluidic communication with the intake manifold.

With the position of common valve 50 as depicted in FIG. 1A, and during boosted conditions when intake manifold pressure (as measured by MAP sensor 124) is higher than CIP and boost pressure is higher than CIP, a nominal quantity of boosted air may flow from intake manifold 44 through conduit 98, across channel 96, through common valve 50, into crankcase ventilation tube 88. Further, this nominal quantity of boosted air may flow past check valve 78, through reverse flow orifice 72, into crankcase 144 via oil separator 86 at the first port 85 of the crankcase. Further still, crankcase vapors including blow-by gases and fuel vapors residing within crankcase 144 may be purged from crankcase 144 along with the nominal quantity of boosted air. The mixture of crankcase vapors and nominal boosted air may exit crankcase 144 via oil separator 84 into conduit 82, and after streaming through conduit 82, may merge with fresh air in intake passage 42 at location 80 upstream of compressor 94. The mix of crankcase gases (as well as nominal boosted air) and fresh intake air in intake passage 42 may then enter an inlet of compressor 94, flow through compressor 94 past intake throttle 62 into intake manifold 44 and into cylinders 30 for combustion. Thus, crankcase gases flowing into the compressor inlet via conduit 82 may not flow directly into the intake manifold.

It will be appreciated that crankcase ventilation may occur, albeit without fresh boosted air (e.g., nominal boosted air from intake manifold), during boosted conditions when the common valve 50 blocks fluidic communication between crankcase 144 and intake manifold 44 (such as when common valve 50 is positioned as shown in FIG. 1B or 1C). Thus, even when fluidic communication between the first port 85 of crankcase 144 and intake manifold 44 is not enabled by common valve 50, crankcase vapors including fuel vapors may flow from second port 87 of crankcase 144 via oil separator 84, along conduit 82 towards location 80 upstream of compressor 94. This crankcase ventilation flow may be termed "stale" air flow as fresh boosted air from the intake manifold 44 may not be received into the crankcase 144 because the common valve 50 blocks communication between the first port of the crankcase and the intake manifold. In other words, when three-way valve 50 seals communication between crankcase ventilation tube 88 and conduit 98, the crankcase may continue to be ventilated by a "stale" air method. The stale air method may allow crankcase gases to exit the crankcase but does not allow fresh air to enter the crankcase. As such, fresh air may not be injected into the crankcase (via either the first port or the second port) to aid in purging blow-by gases from the crankcase.

On the other hand, during non-boosted conditions or when MAP is lower than CIP (or MAP<BP) and when fluidic communication between crankcase 144 (specifically, first port 85) and intake manifold 44 is enabled by common valve 50, fresh intake air may be drawn into conduit 82 at location 80 from intake passage 42 (and from upstream of compressor 94). This fresh air may enter crankcase 144 via oil separator 84 at second port 87 of crankcase 144. Blow-by gases in the crankcase 144 may be purged into crankcase ventilation tube 88 and CV valve 28 using the fresh air received from conduit 82. Specifically, crankcase gases may exit crankcase 144 along with fresh intake air through oil separator 86, flow along crankcase ventilation tube 88, past valve 73, through first orifice 74, and past check valve 76. Alternatively, during deep vacuum conditions in the intake manifold, crankcase gases with fresh intake air may flow at a lower flow rate through second orifice 75 past check valve 76 into intake manifold 44. These crankcase gases may stream through common valve 50 into channel 96, flow via conduit 98 and enter directly into intake manifold 44.

Thus, the crankcase may be ventilated by one of two paths: when MAP<BP (or MAP<CIP), the crankcase gases may be ventilated directly to the intake manifold via CV valve, and when MAP>BP (or MAP>CIP), crankcase gases may be ventilated at first to the compressor inlet via conduit 82 and thereon into the intake manifold.

Turning now to FIG. 1B, it shows example engine system 100 with common valve 50 at a different position than that in FIG. 1A. It will be noted that FIG. 1B includes the same components as described above in reference to FIG. 1A. Since the engine system is the same, each component is numbered similarly and not re-introduced.

FIG. 1B depicts common valve 50 in a position that enables fluidic communication between motive outlet 68 of aspirator 22 and intake manifold 44. As such, controller 12 may command the change in position of the common valve 50 based on engine conditions. For example, common valve 50 may be commanded to the position wherein motive outlet 68 of aspirator 22 is fluidically coupled to intake manifold 44 when a vacuum level in the vacuum reservoir 162 of brake booster 160 is lower than a threshold level.

As shown in FIG. 1B, while the existing position of common valve 50 enables fluidic communication between aspirator 22 and intake manifold 44, it also blocks fluidic communication between crankcase 144 and intake manifold 44. Herein, channel 96 may no longer be fluidically coupled to crankcase ventilation tube 88.

By fluidically coupling aspirator 22 to intake manifold 44, motive flow may now be initiated through the aspirator 22. During non-boosted conditions when MAP<BP (or MAP<CIP), fresh air from intake passage 42 may flow into conduit 92 at location 90. This fresh air may provide motive flow through the aspirator by entering motive inlet 65 of aspirator 22 and exiting via motive outlet 68 into conduit 93, and through common valve 50 into intake manifold 44. As motive air (in the form of fresh intake air flow) flows through aspirator 22, vacuum may be generated at the aspirator and applied to the brake booster 160. Specifically, air from vacuum reservoir 162 of brake booster 160 may be drawn along conduit 112, past node 54, across check valve 52, through suction line 114 and into suction port 67 of aspirator 22. In other words, vacuum generated at aspirator 22 may be supplied from suction port 67 of aspirator 22, through suction line 114, to vacuum reservoir 162 of brake booster 160.

Air drawn from brake booster 160 into suction port 67 of aspirator 22 may merge with motive air (e.g., fresh air) flow through the aspirator 22. Accordingly, a mix of air from intake passage 42 and air from brake booster 160 may flow via motive outlet 68 into conduit 93, through common valve 50, through conduit 98 into intake manifold 44.

During boosted conditions (when MAP>BP or MAP>CIP), reverse flow through the aspirator may occur as boosted air from intake manifold 44 flows into conduit 98, through common valve 50 and into conduit 93. This boosted air may stream through the aspirator 22 by entering at motive outlet 68 and exiting the aspirator 22 at motive inlet 65, and may also generate a smaller amount of vacuum that may be supplied to brake booster 160 as described above in the non-boosted example. Boosted air (and air from brake booster) may exit the aspirator 22 via motive inlet 65 and enter conduit 92 to flow towards location 90 along intake passage 42 at a position upstream of compressor 94. This boosted air and air from the brake booster may enter the inlet of the compressor 94, and flow through intake throttle 62 into intake manifold 44. It will be noted that if aspirator 22 is optimized for forward flow (e.g., from conduit 92 to conduit 93) the aspirator may have reduced effectiveness in the reverse flow direction. As such, aspirator 22 may generate a higher vacuum (and may have higher effectiveness) when air flows from conduit 92 into conduit 93 via aspirator 22. Aspirator 22 may not generate sufficient vacuum with air flowing through aspirator 22 in the reverse direction (e.g., from conduit 93 into conduit 92).

Thus, the aspirator 22 may generate vacuum during both non-boosted as well as boosted conditions. While the above described example includes altering the position of the common valve 50 to generate vacuum when vacuum level in the brake booster is lower than the threshold level, similar adjustments may be made to the common valve when the aspirator is coupled to other (e.g., distinct) vacuum consumers.

FIG. 1C depicts engine system 100 with common valve 50 adjusted to a position wherein air flow through the common valve 50 is fully obstructed. All components shown in FIG. 1C are the same as those described (and included) in FIG. 1A. Accordingly these components are numbered the same and not re-introduced.

Common valve 50 is adjusted to a position in FIG. 1C such that conduit 93 and conduit 98 are not fluidically coupled. At the same time, common valve 50 also blocks fluidic communication between crankcase ventilation tube 88 and channel 96. In this position, therefore, the crankcase may not be ventilated directly into the intake manifold. Further still, aspirator motive flow may not occur and aspirator vacuum may not be generated. In alternative embodiments, common valve 50 may be a two-way valve wherein the valve may be moved between a first position and a second position. As an example, common valve 50 may be adjusted between the position of common valve 50 shown in FIG. 1A and that shown in FIG. 1B.

By designing common valve 50 as a three-way valve and by placing the common valve 50 at the position that concurrently blocks fluid flow from both the crankcase and the aspirator, supplementary air may not be added into the engine. Thus, when desired, the engine can operate at a significantly lower air flow rate, such as during engine idle conditions. Without excess air flow rate at idle, fuel may be conserved. Said another way, excess engine torque may not be shed by making the engine thermally inefficient via spark retard.

It will be noted that when the common valve 50 is in the position depicted in FIG. 1A, crankcase ventilation may occur. As such, crankcase ventilation may be enabled for longer durations of engine operation. With the position of common valve 50 adjusted to that shown in FIG. 1B, the occasional need for brake vacuum replenishment may be served. Further still, when the position of common valve 50 is that depicted in FIG. 1C, an occasional need for significantly lower engine air flow rates at idle may be satisfied.

Engine system 100 may include a control system 15 which in turn comprises controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 124, mass air flow (MAF) sensor 120, BP sensor (not shown), CIP sensor 121, TIP sensor 122, and pressure sensor 125 for sensing vacuum in brake booster 160. Control system 15 with controller 12 may include computer-readable instructions for controlling actuators 81. Example actuators include intake throttle 62, fuel injector 66, common valve 50, etc. As such, the controller 12 receives signals from the various sensors of FIGS. 1A, 1B, and 1C, and employs the various actuators of FIGS. 1A, 1B, and 1C to adjust engine operation based on the received signals and instructions stored on a memory of the controller.

Controller 12 may command common valve 50 to the position shown in FIG. 1C based on existing and desired engine air flow rates. While the engine primarily receives fresh air from the intake passage, wherein an amount of fresh air supplied to the intake manifold is regulated by the position of the intake throttle, the engine may also ingest air from supplementary sources. As described above in reference to FIGS. 1A and 1B, intake manifold 44 of engine 10 may receive air from the brake booster vacuum reservoir as well as blow-by gases and air from the crankcase. Though not shown, additional air and fuel vapors may be received in the engine intake as purge flow from a fuel system canister (amongst other air sources). This additional air flow may be undesirable during certain engine conditions such as engine idle.

For example, a desired engine air flow may be lower than a threshold flow during engine idle conditions. Accordingly, the common valve 50 may be adjusted to a fully closed position during idling conditions to reduce ingesting additional (and unnecessary) air from alternate sources. In the fully closed position of the common valve 50 neither the crankcase 144 nor the aspirator 22 are in fluidic communication with the intake manifold 44. Thus, the intake manifold may not receive supplementary air flow from either the crankcase or the aspirator when common valve 50 is in its fully closed position of FIG. 1C.

In this way, a single electrically controlled valve, e.g. common valve 50, may regulate the flow of crankcase vapors as well as vacuum generation in the engine system 100. Herein, a separate and distinct aspirator flow control valve (such as an aspirator shut-off valve) may not be included or employed enabling a reduction in components in the engine system, and a corresponding reduction in expenses.

However, the engine may not operate for long durations at idle conditions (e.g., warm idle, in neutral gear, etc.) when the desired engine air flow is lower than the threshold flow (e.g., a minimum flow during idle). Specifically, the engine may be at idle for shorter durations especially in cases where the engine is equipped with a start-stop system. Further still, the brake booster may not demand vacuum replenishment continuously, and instead may desire vacuum for shorter durations.

Thus, common valve 50 may be adjusted to the position enabling fluidic communication between the crankcase and the intake manifold for a larger duration of engine operation. As such, a default position of the common valve 50 may be the one fluidically coupling the crankcase (specifically, first port of crankcase) to the intake manifold as in FIG. 1A. To elaborate, common valve 50 may be placed at the position coupling CV valve 28 and the intake manifold for longer durations. Accordingly, the crankcase may be ventilated almost constantly or continuously. Constant crankcase ventilation may also enable enhanced oil separation. Thus, common valve 50 may be placed at one of the position depicted in FIG. 1B and position depicted in FIG. 1C for shorter durations relative to the duration at the default position of FIG. 1A.

In an example representation, an example system may comprise an engine including an intake passage and an intake manifold, a compressor coupled in the intake passage providing boosted air to the intake manifold, an intake throttle coupled in the intake passage downstream of the compressor and upstream of the intake manifold, a crankcase coupled fluidically to a crankcase ventilation (CV) valve, an aspirator positioned across each of the compressor and the intake throttle, the aspirator coupled to a vacuum consumption device (such as brake booster 160), a motive inlet of the aspirator fluidically coupled to the intake passage upstream of the compressor, a three-way valve (such as common valve 50) fluidically coupled to each of the intake manifold, the CV valve, and a motive outlet of the aspirator, and a controller with computer-readable instructions stored in non-transitory memory for placing the three-way valve in a first position (such as that shown in FIG. 1A) to enable fluidic communication between the crankcase and the intake manifold while blocking fluidic communication between the motive outlet of the aspirator and the intake manifold, and responsive to a demand for vacuum from the vacuum consumption device, shifting the three-way valve to a second position (such as that shown in FIG. 1B) to enable fluidic communication between the motive outlet of the aspirator and the intake manifold while blocking fluidic communication between the crankcase and the intake manifold. The controller may also include further instructions for adjusting the three-way valve to a third position (such as that shown in FIG. 1C) wherein each of fluidic communication between the motive outlet of the aspirator and the intake manifold and fluidic communication between the crankcase and the intake manifold is blocked.

Turning now to FIG. 2, it portrays example routine 200 illustrating adjusting the common valve for crankcase ventilation based on existing engine conditions. Specifically, a position of the common valve (also referred to herein as three-way valve), such as common valve 50 of engine system 100, may be adjusted based on desired engine air flows. As such, routine 200 (and routine 300 of FIG. 3) will be described in relation to the engine system 100 shown in FIGS. 1A, 1B, and 1C, but it should be understood that similar routines may be used with other systems without departing from the scope of this disclosure. Instructions for carrying out routine 200, as well as routine 300 further below, included herein may be executed by a controller, such as controller 12 of engine system 100, based on instructions stored on a memory of the controller and in conjunction with signals received from sensors of the engine system, such as the sensors described above with reference to FIG. 1A. The controller may employ engine actuators of the engine system, such as the actuators of FIG. 1A to adjust engine operation, according to the routines described below.

At 202, routine 200 estimates and/or measures existing engine conditions. For example, engine conditions such as engine speed, engine load, MAP, MAF, TIP, CIP, air-fuel ratio, etc. may be estimated and/or measured. Engine speed may be based, for example, on signals received from a crankshaft sensor. Next, at 204, routine 200 determines if MAP is lower than CIP. In one example, MAP may be lower than CIP during non-boosted engine conditions wherein TIP may be substantially equal to barometric pressure. In another example, MAP may be lower than CIP during steady state engine operation wherein a shallow intake manifold vacuum may be present.

If it is determined that MAP is not lower than CIP, routine 200 continues to 206 to determine that MAP is higher than CIP. As such, the engine may be operating under boosted conditions. For example, the engine may be boosted when a higher torque is demanded. In another example, the engine may be boosted at lower levels, such as when the vehicle is cruising. Next, at 208, routine 200 may place the common three-way valve (such as common valve 50) at an initial position enabling crankcase ventilation. Specifically, the common valve (or three-way valve) may be set at the position shown in FIG. 1A enabling fluidic communication between first port of crankcase 144 (via oil separator 86) and intake manifold 44. Since the engine is boosted and MAP is greater than CIP, at 210, reverse flow of boosted air may occur through the CV valve. As such, a smaller amount of boosted air from intake manifold 44 may flow through conduit 98 and channel 96, through common valve 50 into crankcase ventilation tube 88, and through second orifice 72 into crankcase 144. Further, crankcase vapors may exit the crankcase along with the smaller amount of boosted air through conduit 82 and enter intake passage 42 upstream of the compressor 94. Thus, at 210, CV flow may be directed to the compressor inlet. Further still, aspirator motive flow may be disabled by the position of the common valve 50. Routine 200 then proceeds to 228 to check for vacuum demand from a vacuum consumer such as a brake booster. As such, routine 300 of FIG. 3 may be activated. Routine 200 then ends.

Returning now to 204, if MAP is determined to be lower than CIP, routine 200 continues to 212 to determine if a desired engine air flow is lower than a threshold flow, Thr_f. The desired engine air flow may be based on existing engine conditions. For example, during cruising conditions, a higher air flow into the engine may be desired. In another example, the desired engine air flow may be lower during idle conditions. In yet another example, a significantly higher air flow rate may be desired during tip-in conditions. As such, the threshold flow (Thr_f) may be an engine air flow desired at idling conditions. Accordingly, Thr_f may be a significantly lower air flow. When the desired engine air flow is at or lower than the threshold flow, Thr_f, air flow from supplementary sources such as the crankcase, aspirator, brake booster, etc. may be terminated. By ceasing supplementary air from sources other than the intake throttle, a desired air-fuel ratio during idle may be maintained. In addition, fueling errors may be reduced and fuel may be saved since there is no additional air received in the intake manifold. In engines equipped with start-stop systems, air flow from supplementary sources may also be ended during idle since the engine may be shut down (and at rest) during idle.

At 206, if it is determined that the desired engine air flow is higher than the threshold flow, routine 200 progresses to 214 to set the three-way valve (e.g., common valve 50) to its default position of fluidically coupling the crankcase to the intake manifold. As such, since the desired engine air flow is higher than the threshold flow, air flow from sources other than the intake throttle may be allowed for engine ingestion. Thus, crankcase ventilation may be enabled at 214 while at the same time, as at 216, aspirator motive flow is disabled.

Next, at 218, crankcase vapors flow through the CV valve (e.g., CV valve 28) and the three-way valve into the intake manifold. Since MAP is lower than CIP, fresh air from the intake passage is drawn into conduit 82 and thereon into crankcase 144. This fresh air may purge the crankcase of blow-by gases via crankcase ventilation tube 88, past first orifice 74 of CV valve 28, through common valve 50, into channel 96, and conduit 98, and then into intake manifold 44. Thus, crankcase gases may be ventilated directly into the intake manifold. In contrast, during boosted conditions, crankcase gases are purged at first to the inlet of the compressor, and then are directed to the intake manifold past the intake throttle. Routine 200 then proceeds to 228 to check for vacuum demand from a vacuum consumer such as a brake booster. As such, routine 300 of FIG. 3 may be activated. Routine 200 then ends.

If, at 212, it is determined that the desired engine air flow is lower than the threshold flow (Thr_f), routine 200 continues to 220 to set the common valve (three-way valve) to the fully closed position. As such, the engine may be idling. Accordingly, each of crankcase ventilation flow and aspirator motive flow may be blocked at 220. At 222, crankcase ventilation may not occur directly into the intake manifold as there is no fluidic communication between the first port of the crankcase and the intake manifold. Similarly, at 224, aspirator motive flow, and therefore aspirator vacuum generation, may not occur since the motive outlet of the aspirator and the intake manifold are not fluidically coupled. In other words, there may be no fluid flow through the common three-way valve into the intake manifold and the desired engine air flow may be obtained by terminating supplementary air flow.

Next, at 226, routine 200 restores the three-way valve to the position enabling crankcase ventilation when the desired engine air flow is higher than the threshold flow. Thus, the fully closed position of the common valve may be maintained until the desired engine air flow is higher than the threshold flow. In one example, fluidic coupling of the crankcase and the intake manifold may be enabled via the three-way valve when the engine is no longer idling. For example, the engine speed may be higher than idle speed. In another example, the three-way valve may be adjusted to its default position of fluidic communication between crankcase and intake manifold when a transmission gear is not at neutral.

Next, at 228, routine 200 checks for any vacuum demand from the vacuum consumer. Based on the demand for vacuum, the position of the three-way valve may be further adjusted. Routine 200 then ends.

Turning now to FIG. 3, it depicts an example routine 300 for adjusting the position of the three-way valve based on a demand for vacuum from a vacuum consumer. Specifically, the three-way valve may be adjusted from its initial position, such as the position enabling a fluidic coupling of the crankcase and the intake manifold, to the position enabling fluidic communication between the aspirator and the intake manifold when vacuum is desired. As such, routine 300 will be described in relation to the engine system 100 shown in FIGS. 1A, 1B, and 1C, but it should be understood that similar routines may be used with other systems without departing from the scope of this disclosure. Instructions for carrying out routine 300 included herein may be executed by a controller, such as controller 12 of engine system 100, based on instructions stored on a memory of the controller and in conjunction with signals received from sensors of the engine system, such as the sensors described above with reference to FIG. 1A. The controller may employ engine actuators of the engine system, such as the actuators of FIG. 1A to adjust engine operation, according to the routines described below.

At 304, routine 300 places the three-way valve at an initial position to enable crankcase ventilation. Herein, the crankcase may be in direct fluidic communication with the intake manifold via the common valve 50 while aspirator motive flow is blocked. As described earlier, the position of the three-way valve that enables crankcase ventilation, such as that shown in FIG. 1A, may be a default position of the three-way valve, and may be used for longer durations (e.g., overall, and not continuous) particularly during engine operation when the desired engine air flow is higher than Thr_f and when there is no demand for vacuum from a vacuum consumer.

Next, at 306, routine 300 determines if vacuum in the brake booster (termed, brake vacuum) is lower than a threshold level, Thr_BV. In one example, the threshold level of vacuum in the vacuum reservoir of the brake booster may be a minimum level of vacuum that is required for brake booster operation. Pressure in the vacuum reservoir of the brake booster may be measured by a pressure sensor, such as pressure sensor 125 of engine system 100. As such, vacuum may be demanded for replenishment of the vacuum reservoir in the brake booster when vacuum level in the vacuum reservoir is lower than the threshold level, Thr_BV.

It will be appreciated herein that though the above example depicts the brake booster as the vacuum consumer of engine system 100, the engine system in other embodiments may include additional distinct vacuum consumption devices that may receive vacuum from the aspirator. For example, vacuum consumers in alternative engine embodiments may include in addition to the brake booster, vacuum actuated valves such as charge motion control valves, and components such as the fuel system canister that use vacuum for purging, etc. In these cases, vacuum demand from the various vacuum consumers may be determined at 306 of routine 300. Herein, in one example, vacuum may be demanded when the vacuum consumption device is actuated (e.g., when the vacuum actuated valve is actuated). In another example, if the vacuum consumption device includes a vacuum reservoir, it may be determined if the vacuum requirement of the device exceeds the vacuum available in the reservoir.

Returning to 306 of routine 300, if it is determined that vacuum levels in the brake booster are higher than the threshold level, Thr_BV, routine 300 proceeds to 320 to maintain the three-way valve at its initial position such as that at 304 enabling crankcase ventilation. If, on the other hand, it is confirmed that brake vacuum levels in the vacuum reservoir of the brake booster are lower than the threshold level, routine 300 progresses to 308 to adjust the three-way valve to enable aspirator motive flow. Herein, the three-way valve may be shifted from its initial position of enabling crankcase ventilation to that enabling generation of aspirator vacuum. Specifically, the three-way valve may now be placed in the position depicted in FIG. 1B wherein the motive outlet of the aspirator is fluidically coupled to the intake manifold via the three-way valve.

By modifying the position of the three-way valve to enable aspirator motive flow, crankcase ventilation may be discontinued, at 310. Further, at 312, motive flow through the aspirator may produce vacuum at the aspirator suction port. Motive air may flow from the compressor inlet to the intake manifold via the aspirator when MAP is lower than CIP. Conversely, motive air may flow from the intake manifold to the compressor inlet via the aspirator when MAP is higher than CIP. Furthermore, at 314, the vacuum generated at the aspirator may be provided to the brake booster vacuum reservoir.

Next, at 316, routine 300 checks if vacuum levels in the vacuum reservoir of the brake booster are higher than the threshold level, Thr_BV. As mentioned earlier, vacuum levels (e.g. negative pressure levels) in the vacuum reservoir of the brake booster may be measured by a pressure sensor coupled to the vacuum reservoir. If vacuum levels remain below the threshold level, routine 300 continues to 318 to maintain the three-way valve at the position allowing aspirator motive flow. Additional vacuum may be generated by the aspirator due to the continued motive flow, and this vacuum may be supplied to the brake booster (or vacuum consumer demanding vacuum). Routine 300 may then return to 316.

If, however, it is determined that vacuum levels in the vacuum reservoir of the brake booster are higher than the threshold level, routine 300 progresses to 320 wherein the position of the three-way valve is modified and returned to its default (and initial) position enabling crankcase ventilation. Accordingly, as soon as vacuum demand for the vacuum consumer is met, crankcase ventilation may be re-initiated. Specifically, the three-way valve may be returned to its default position fluidically coupling the first port of the crankcase to the intake manifold when sufficient vacuum is provided to the vacuum reservoir or vacuum consumer. Routine 300 then ends.

In this way, a controller of the engine system 100 may actively decide if crankcase ventilation occurs or aspirator motive flow is enabled (and thereby, aspirator vacuum is generated). Further, in the above described example, the crankcase may be ventilated during a significant duration of engine operation while aspirator motive flow may occur for relatively shorter durations. While crankcase ventilation is enabled during engine operation, if a demand for vacuum is received from a vacuum consumer, the three-way valve may be switched from allowing crankcase ventilation to enabling aspirator motive flow for generating aspirator vacuum. Accordingly, aspirator motive flow may be enabled instead of crankcase ventilation. As such, crankcase ventilation may be enhanced in the engine system of FIGS. 1A, 1B, and 1C by enabling longer durations for purging crankcase gases. Further still, the three-way valve may be fully closed only when air flow received from either the crankcase or the aspirator motive flow may adversely affect engine operation. As an example, during conditions when the desired engine air flow is lower than the threshold flow, Thr_f, air flow from the crankcase or air flow from the aspirator may be terminated.

Thus, an example method may comprise selectively enabling one of crankcase ventilation flow and aspirator motive flow via an electrically controlled valve responsive to a desired engine air flow and a demand for vacuum from a vacuum consumer. Herein, crankcase ventilation flow may be enabled when the desired engine air flow is higher than a threshold flow. Accordingly, the engine may ingest gases from the crankcase when the desired engine air flow is higher than the threshold flow, such as during conditions when the engine is not idling. Crankcase ventilation flow may include flowing fuel vapors from a crankcase of the boosted engine through a crankcase ventilation (CV) valve and the electrically controlled valve directly into an intake manifold of the boosted engine. In another example, crankcase ventilation flow may also include flowing fuel vapors from the crankcase of the boosted engine to an inlet of a compressor during boosted conditions when a pressure in the intake manifold of the boosted engine is higher than barometric pressure (or a pressure at the inlet of the compressor). Aspirator motive flow may be enabled via the electrically controlled valve in response to the demand for vacuum from the vacuum consumer. As such, the aspirator motive flow may generate a vacuum, wherein the vacuum may be supplied to the vacuum consumer. Aspirator motive flow may include flowing air from an inlet of a compressor through an aspirator into the intake manifold of the boosted engine via the electrically controlled valve. Alternatively, when intake manifold pressure is higher than the pressure at the compressor inlet, aspirator motive flow may also include flow from the intake manifold to the inlet of the compressor. It will be noted, that aspirator motive flow may not flow through the CV valve, and the crankcase ventilation flow may not flow through the aspirator in the depicted example. The example method may further comprise terminating each of crankcase ventilation flow and aspirator motive flow via the electrically controlled valve responsive to the desired engine air flow being lower than the threshold flow.

Referring now to FIG. 4, it includes map 400 depicting an example engine operation in an engine system, such as engine system 100, including the three-way valve (e.g., common valve 50 of FIGS. 1A, 1B, and 1C). Specifically, operation of the three-way valve in enabling either crankcase ventilation or aspirator motive flow is illustrated in FIG. 4. Map 400 includes position of a brake pedal in an example vehicle at plot 402, a level of vacuum (also termed, negative pressure) in the brake booster at plot 404, crankcase ventilation (CV) flow via the three-way valve at plot 406, motive flow through the aspirator (or aspirator motive flow, also termed AM flow) at plot 408, status of the three-way valve at plot 410, desired engine air flow at plot 412, engine speed at plot 414, and a position of an accelerator pedal at plot 416.

Line 407 represents a threshold level of vacuum in the brake booster such as Thr_BV of routine 300. As such, line 407 may represent a minimum threshold vacuum in the brake booster reservoir. Line 413 represents a threshold flow, such as Thr_f, of engine air. The status of the three-way valve can be varied between one of the default position (or a first position) allowing CV flow, a position (such as a second position) allowing only aspirator motive flow, and a position (such as a third position) blocking each of the CV flow and the aspirator motive flow. In the third position of the three-way valve, crankcase ventilation flow (into the intake manifold or via boosted air from intake manifold) may not be allowed. At the same time, aspirator motive flow may also not be allowed with the three-way valve in the third position. The above listed plots are plotted against time along the x-axis. As such, time increases from the left of the x-axis to the right of the x-axis. It will be noted that CV flow through the three-way valve (plot 406) when in default position may include the flow of blow-by gases from the crankcase to the intake manifold when MAP<CIP or the smaller flow of boosted air from the intake manifold to the crankcase when MAP>CIP.

Between t0 and t1 on the x-axis, the engine may be idling with each of the accelerator pedal and the brake pedal being released (or "Off"). For example, an engine start may have occurred prior to t1. Since the engine is idling, the desired engine air flow rate may be lower than the threshold flow (line 413). Accordingly, the three-way valve is placed at the third position which may be its fully closed position (plot 410). Thus, both CV flow through the three-way valve and aspirator motive flow through the three-way valve are blocked. Further, CV flow directly into the intake manifold may be absent (plot 406) and aspirator motive flow may also not be enabled (plot 408). Further still, prior to t1, brake booster vacuum level may be sufficient as the level of brake booster vacuum is higher than the threshold level (line 407).

At t1, the accelerator pedal may be fully depressed to initiate a tip-in condition with a sudden increase in torque demand. Accordingly, engine speed rises sharply to a higher speed and the desired engine air flow is significantly higher than the threshold flow. In response to the change in desired engine air flow to higher than the threshold flow, crankcase ventilation flow may be enabled by placing the three-way valve in its default (or first) position. Herein, the three-way valve may enable fluidic communication between the crankcase (specifically, oil separator 86 of crankcase 144) and intake manifold 44. Thus, CV flow may be enabled (plot 406) at t1 while aspirator motive flow continues to be blocked (plot 408). As such, between t1 and t2, the engine may be boosted and crankcase ventilation flow may occur in the direction of the compressor inlet. Herein, boosted air from the intake manifold may enter the crankcase through the three-way valve (and the CV valve) and purge the crankcase of blow-by gases to upstream of the compressor.

At t2, the brake pedal may be applied (e.g., depressed to a small extent or towards "on") by the vehicle operator upon which vacuum in the brake booster reservoir is consumed to enable wheel braking. As brake application continues, the quantity of vacuum in the brake booster reservoir reduces. However, the level of vacuum within the reservoir remains above threshold 407. Due to brake application and simultaneous release of the accelerator pedal, engine speed may decrease, thereby reducing engine torque output. In order to reduce the engine torque output and engine speed, an intake throttle may be adjusted to a more closed position reducing the engine air flow into the engine. As such, desired engine air flow also reduces at t2 but remains higher than the threshold flow (line 413).

At t3, the brake pedal is released and the accelerator pedal is depressed to an approximate half-depressed position. Further, the engine may begin operation at steady state conditions. Steady state conditions may include desired engine air flow being higher than the threshold flow. Therefore, the three-way valve continues in its first position enabling crankcase ventilation. During steady state operation the intake manifold may have a shallow vacuum. Accordingly, crankcase ventilation may now occur directly into the intake manifold. Herein, fresh air from upstream of the compressor is received in the crankcase enabling purging of crankcase gases via the CV valve and the three-way valve directly into the intake manifold. Between t3 and t4, since the brake pedal is released, vacuum level in the brake booster remains at the level attained at t3.

At t4, the brake pedal may be applied again. Brake pedal application at t4 may be more forceful (e.g., depressed further and faster) as compared to the brake pedal application at t2. As a result, a steeper drop in vacuum levels within the brake booster reservoir is observed. In particular, the harder brake pedal application at t4 may result in vacuum depletion within the vacuum reservoir of the brake booster to below threshold level (line 407) at t5. As the brakes are applied, between t4 and t5, engine speed may reduce while the accelerator pedal is released.

At t5, in response to the drop in brake boosted vacuum to lower than the threshold level, a demand for additional vacuum may be received by the controller. At t5, the brake pedal is released, and the accelerator pedal may again be depressed to about halfway returning the engine to steady state operation. Since the desired engine air flow continues to be higher than the threshold flow at t5, the three-way valve is now adjusted from the position enabling crankcase ventilation to the position enabling vacuum generation at the aspirator e.g. by enabling aspirator motive flow. As such, crankcase ventilation may be suspended while aspirator motive flow is initiated. It will be noted that since the intake manifold may have a shallow vacuum, vacuum in the intake manifold may be inadequate for replenishing the brake booster vacuum reservoir.

With the three-way valve at the second position that allows only aspirator motive flow (plot 410), motive flow through the aspirator may be initiated (plot 408) at t5 while simultaneously discontinuing crankcase ventilation flow via the three-way valve (plot 406). Thus, at t5, the three-way valve enables fluidic communication between the motive outlet of the aspirator and the intake manifold while at the same time disabling fluidic communication between the first port of the crankcase and the intake manifold.

The vacuum generated at the aspirator is applied to the brake booster between t5 and t6. Accordingly, between t5 and t6, the vacuum level in the reservoir rises towards and higher than threshold 407.

Thus, an example method for a boosted engine may comprise during a first condition, flowing crankcase ventilation flow to the intake manifold while not flowing aspirator motive flow, and during a second condition, enabling aspirator motive flow while not flowing crankcase ventilation flow to the intake manifold, and during a third condition, not flowing each of crankcase ventilation flow and aspirator motive flow. The first condition, the second condition, and the third condition may be mutually exclusive of each other. The first condition may include a desired engine air flow higher than a threshold flow (such as between time t1 and t5 of map 400), the second condition may include a vacuum level lower than a threshold level in a vacuum consumption device (such as at t5 in map 400), and the third condition may include the desired engine air flow lower than the threshold flow (such as between t0 and t1 of map 400). The second condition may further include desired engine air flow being higher than the threshold flow.

Returning to map 400, at t6, the brake pedal may be applied to slow the vehicle to a gradual rest. The engine speed may decrease to idle speed as the engine begins idling. As such, the accelerator pedal may be fully released after t6. With the engine decelerating to idle, desired engine air flow drops to below that of the threshold flow (line 413) at t6. Accordingly, the three-way valve is adjusted to the fully closed (e.g., third) position blocking aspirator motive flow. CV flow via the three-way valve may also be blocked. Therefore, aspirator vacuum generation may be terminated at t6 and vacuum supply to the brake booster may be stopped.

The application of the brake pedal at t6 also results in a reduction in vacuum level of the brake booster. Since the vacuum level of the brake booster was just above the threshold level at t6, application of the brake pedal at t6 causes a decrease in vacuum levels to below the threshold level at t7. Even though brake booster vacuum level is below threshold level at t7, aspirator motive flow cannot be enabled since the desired engine air flow remains lower than the threshold flow. Therefore, aspirator vacuum cannot be generated and may not be supplied to the brake booster. In some examples, the brake booster may now be replenished by vacuum from the intake manifold.

Thus, between t7 and t8, vacuum level in the brake booster may remain below the threshold as the brake pedal continues to be applied. As an example, the vehicle may be stopped at a traffic light. Vacuum levels may not decrease further if the brake booster is receiving vacuum from the intake manifold. Further, between t7 and t8, the three-way valve may remain at its fully closed position to block any fluid flow therethrough. To elaborate, between t6 and t8, there may be no flow of gases from the crankcase through the three-way valve and aspirator motive flow also may not occur through the three-way valve when the three-way valve is fully closed.

At t8, engine idling may end as the accelerator pedal is depressed and engine speed increases to set the vehicle in motion. At the same time, the brake pedal is released. Further, the desired engine air flow increases to higher than the threshold flow. In response to this increase of desired engine air flow, and the vacuum level being lower than threshold level (line 407), the three-way valve may be adjusted to the second position to enable vacuum generation at the aspirator. Therefore, at t8, aspirator motive flow may commence (plot 408) while CV flow through the three-way valve remains obstructed (plot 406). Vacuum may now be generated at the aspirator which may then be supplied to the brake booster. Accordingly, vacuum levels in the brake booster increase steadily past t8 and reach adequate vacuum levels at t9. In response to adequate vacuum level in the brake booster and desired engine air flow being higher than the threshold flow, the three-way valve may now be adjusted to the first position (or default position) enabling CV flow through the three-way valve. Accordingly, aspirator motive flow may be discontinued while CV flow is enabled.

In this way, the three-way valve may be adjusted to one of three positions: a first position allowing crankcase ventilation flow with fresh air (or boosted air), a second position allowing aspirator motive flow to generate aspirator vacuum, and a third position blocking any fluid flow through the three-way valve. The third position of the three-way valve may be utilized only when a desired engine air flow (based on air-fuel ratio and engine conditions) is lower than a threshold flow. Accordingly, the three-way valve may be placed in the third position for substantially shorter durations of engine operation. Aspirator vacuum may be demanded when a vacuum consumer indicates a need for replenishment. Thus, the three-way valve may be positioned at the first position allowing crankcase ventilation for significantly longer durations relative to either the second position or the third position. It will be noted that the three-way valve may be placed at the second position for aspirator motive flow in response to vacuum demand from a vacuum consumer while the desired engine air flow is higher than the threshold flow.

Another example method for a boosted engine may comprise discontinuing vapor flow from a crankcase by adjusting a valve (such as three-way valve of engine system 100) in response to determined brake actuation. The determined brake actuation may include a reduction in vacuum level in a brake booster, the vacuum level reducing below a threshold level. As an example, brake actuation at t4 in map 400 reduces vacuum level in the brake booster to below the threshold level. Adjusting the valve may include adjusting the valve to enable motive flow through an aspirator, the aspirator coupled to the brake booster, and wherein the motive flow through the aspirator generates vacuum. The method may further comprise adjusting the valve to enable vapor flow (including crankcase gases) from the crankcase and discontinue motive flow through the aspirator in response to each of vacuum level in the brake booster higher than the threshold level and a desired engine air flow higher than a threshold flow (such as at t9 in map 400). The method may also comprise adjusting the valve to discontinue each of vapor flow from the crankcase and motive flow through the aspirator in response to the desired engine air flow being lower than the threshold flow (e.g., as at t6 in map 400). It will be noted that the valve may be electrically controlled, and wherein adjusting the valve may include commanding the valve via a controller, such as controller 12 of engine system 100.

In this way, a crankcase of a boosted engine may be more effectively purged of fuel vapors and blow-by gases. The three-way valve may enable longer durations of crankcase ventilation relative to that for vacuum generation at the aspirator. Further still, the three-way valve may also enable a longer duration of crankcase ventilation relative to that for discontinuing supplementary air flow directly into the intake manifold (e.g., at third position, or fully closed position). A technical effect of using the three-way valve is that the amount of ventilation from the crankcase is increasing, which also provides an increase in the efficiency of oil separators of the crankcase. Additionally, engine performance during short engine run periods may be increased. Further still, a single valve may be used to control each of crankcase ventilation and aspirator motive flow allowing a reduction in components, and thereby reducing expenses and packaging issues.

As one embodiment, an example system may comprise a boosted engine including a compressor, a crankcase ventilation system including a crankcase ventilation (CV) valve coupled to a crankcase of the boosted engine, an aspirator capable of generating vacuum, the aspirator coupled to a vacuum consumer, a three-way valve coupled to each of the crankcase and the aspirator, and a controller with computer-readable instructions stored in non-transitory memory for, in response to a demand for vacuum from the vacuum consumer, adjusting the three-way valve to enable motive flow through the aspirator instead of enabling crankcase ventilation flow. The three-way valve may be coupled intermediate the CV valve and an intake manifold, and wherein the three-way valve may be coupled intermediate the aspirator and the intake manifold. The controller may include further instructions for adjusting the three-way valve to enable crankcase ventilation flow in response to the demand for vacuum from the vacuum consumer being met. The controller may also include instructions for modifying the three-way valve to block each of crankcase ventilation flow and motive flow through the aspirator in response to a desired engine air flow lower than a threshold flow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
completely blocking vapor flow through an electronically controlled valve from a crankcase by adjusting the electronically controlled valve in response to determined brake actuation with decreased vacuum level in a brake booster, while enabling motive flow through an aspirator coupled to the brake booster, wherein the motive flow through the aspirator generates vacuum; and
adjusting the electronically controlled valve to enable vapor flow from the crankcase and completely block motive flow through the aspirator in response to each of increased vacuum level in the brake booster and a desired engine air flow higher than a threshold flow.

2. The method of claim 1, wherein the determined brake actuation further includes the decreased vacuum level is below a threshold level.

3. The method of claim 2, where the increased vacuum level in the brake booster is higher than the threshold level.

4. The method of claim 3, further comprising adjusting the electronically controlled valve to completely discontinue through the electronically controlled valve each of vapor flow from the crankcase and motive flow through the aspirator in response to the desired engine air flow being lower than the threshold level.

5. The method of claim 1, wherein adjusting the electronically controlled valve includes commanding the electronically controlled valve via a controller.

* * * * *